United States Patent
Eberlein (10) Patent No.: US 10,270,743 B2
(45) Date of Patent: Apr. 23, 2019

(54) PROXY-BASED ACCESS TO REMOTE DATABASE

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 270 days.

(21) Appl. No.: 15/290,301

(22) Filed: Oct. 11, 2016

(65) Prior Publication Data

US 2018/0103009 A1    Apr. 12, 2018

(51) Int. Cl.
*H04L 29/06*    (2006.01)
*G06F 21/62*    (2013.01)
*G06F 16/00*    (2019.01)

(52) U.S. Cl.
CPC ........ *H04L 63/029* (2013.01); *G06F 21/6227* (2013.01); *H04L 63/0281* (2013.01); *H04L 63/083* (2013.01); *G06F 16/00* (2019.01); *H04L 63/0815* (2013.01)

(58) Field of Classification Search
CPC . H04L 63/0281; H04L 63/029; H04L 63/083; G06F 21/6227
See application file for complete search history.

(56) References Cited

U.S. PATENT DOCUMENTS

| | | | |
|---|---|---|---|
| 9,390,082 B1* | 7/2016 | Stolte | G06F 17/30592 |
| 2003/0110113 A1* | 6/2003 | Martin | G06Q 40/04 705/36 R |
| 2010/0318570 A1* | 12/2010 | Narasinghanallur | G06F 17/3056 707/783 |
| 2012/0331527 A1* | 12/2012 | Walters | G06F 21/6218 726/4 |
| 2016/0219060 A1* | 7/2016 | Karunakaran | G06F 21/33 |

* cited by examiner

*Primary Examiner* — Brandon S Hoffman
*Assistant Examiner* — Thong P Truong
(74) *Attorney, Agent, or Firm* — Fountainhead Law Group P.C.

(57) ABSTRACT

Proxy-based access occurs between a cloud database and analytical client tool, without requiring a separate intervening application server. A client proxy (tool side) communicates exclusively with a server proxy (database side). In response to a connect request in a database protocol (e.g., Structured Query Language—SQL) received from the tool by the client proxy, the server proxy is caused to initiate an authentication process (e.g., using Security Assertion Markup Language—SAML) with an Identity Provider (IdP). The client proxy intercepts and extracts a security token from the IdP in order to establish a tunnel with the server proxy. Upon ultimately receiving the connect command through the tunnel, the server proxy replaces an end-user credential (recognized by the tool but meaningless to the database) with the security token in order to establish a technical user and a query session context that can be recognized by the database.

19 Claims, 6 Drawing Sheets

PROXY-BASED ACCESS TO REMOTE DATABASE

BACKGROUND

Unless otherwise indicated herein, the approaches described in this section are not prior art to the claims in this application and are not admitted to be prior art by inclusion in this section.

Embodiments relate to databases, and in particular to methods and apparatuses providing access to databases that are located remotely in the cloud.

Databases offer a useful way of storing large volumes of data that may be organized into complex data structures. Some scenarios call for end-user tools to access databases directly in order to run analytical queries, without the need for an intermediary (third) application tier.

Such a "two-tier" access mode is beneficial in that it provides additional capabilities (e.g., calculation views, geospatial procedures, stored procedures) that perform advanced data transformations efficiently and powerfully within the database itself. This permits the execution of analytical scenarios, without requiring data post-processing in an application server. These "two-tier" solutions are attractive due to their simplicity and high performance.

SUMMARY

Embodiments provide proxy-based access between an analytical client tool and a cloud database across a communications network, without the need for a separate intervening application server. A client proxy (tool side) communicates exclusively with a server proxy (database side). In response to a connect request in a database protocol (e.g., Structured Query Language—SQL) received from the tool by the client proxy, the server proxy is caused to initiate an authentication process (e.g., using Security Assertion Markup Language—SAML) with an Identity Provider (IdP). The client proxy intercepts and extracts a security token from the IdP in order to establish a tunnel (e.g., via WEB-SOCKETS) with the server proxy. Upon ultimately receiving the connect command through the tunnel, the server proxy replaces an end-user credential (recognized by the tool but meaningless to the database) with the security token in order to establish a technical user and a query session context that can be recognized by the database.

The client/server proxies function transparently, avoiding the need to modify the tool and/or database. Certain embodiments may implement the server proxy utilizing an existing powerful in-memory database engine of a cloud in-memory database.

An embodiment of a computer-implemented method comprises, in response to a connect command in a database protocol received from a client proxy, a server proxy initiates an authentication request to an identity provider. The server proxy establishes a tunnel with the client proxy by authenticating an end-user from a security token issued by the identity provider and extracted by the client proxy. The server proxy receives the connect command and a credential through the tunnel. The server proxy replaces the credential with a technical user credential. The server proxy communicates the connect command to the database using the technical user credentials. The server proxy adds the security token to a session context established in the database. The server proxy receives through the tunnel a query command including the credential. The server proxy forwards the query command to the database within the session context. The server proxy receives from the database a query result corresponding to the query command. The server proxy forwards the query result through the tunnel to the client proxy.

A non-transitory computer readable storage medium embodies a computer program for performing a method comprising, in response to a connect command in a database protocol received from a client proxy, a server proxy initiating an authentication request to an identity provider. The server proxy establishes a tunnel with the client proxy by authenticating an end-user from a Security Assertion Markup Language (SAML) token issued by the identity provider and extracted by the client proxy. The server proxy receives the connect command and a credential through the tunnel. The server proxy replaces the credential with a technical user credential. The server proxy communicates the connect command to the database using the technical user credentials. The server proxy adds the SAML token to a session context established in the database. The server proxy receives through the tunnel a query command including the credential. The server proxy forwards the query command to the database within the session context. The server proxy receives from the database a query result corresponding to the query command. The server proxy forwards the query result through the tunnel to the client proxy.

An embodiment of a computer system comprises one or more processors and a software program, executable on said computer system. The software program is configured to cause an in-memory database engine to function as a server proxy that in response to a connect command in a database protocol received from a client proxy, initiates an authentication request to an identity provider. The server proxy establishes a tunnel with the client proxy by authenticating an end-user from a security token issued by the identity provider and extracted by the client proxy. The server proxy receives the connect command and a credential through the tunnel. The server proxy replaces the credential with a technical user credential. The server proxy communicates the connect command to the database using the technical user credentials. The server proxy adds the security token to a session context established in the database. The server proxy receives through the tunnel a query command including the credential. The server proxy forwards the query command to the database within the session context. The server proxy receives from the database a query result corresponding to the query command. The server proxy forwards the query result through the tunnel to the client proxy.

In certain embodiments the database protocol comprises structured query language (SQL).

In some embodiments the database protocol comprises extensible markup language for analysis (XMLA).

In various embodiments the session context is determined from the security token.

According to certain embodiments the session context is determined from the credential.

The following detailed description and accompanying drawings provide a better understanding of the nature and advantages of embodiments.

DETAILED DESCRIPTION

Described herein are methods and apparatuses allowing tunnel access to a cloud database. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Prior to the advent of the internet, databases were typically located on-premises at an enterprise. Accordingly, user access to databases occurred exclusively internally, behind a firewall or other boundary that ensured secure transfer of information from the database.

Increasingly however, databases are located remotely from the enterprise on the cloud, and are accessed by end-users over communications networks. Such cloud-based database configurations may pose certain security risks associated with the public nature of communications networks such as the internet.

One approach to providing secure cloud database access is to employ an intermediary application server. In such "three-tier" approaches authentication and authorization issues are avoided, as technical users for the database connection are simply configured in the on-premise application server, and service-to-service authorization is intended.

A two-tier database access model, however, lacks any such intermediary application server that could be trusted or allow security issues to be addressed. For example, database protocols are not exposed over the internet, and enterprises often restrict even outbound network traffic to HTTP(S). Therefore, direct network connectivity between analytical client tools and cloud databases may not be able to be established.

A connection may be tunneled from an end-user computer to the cloud database over HTTP(S) transparently for the client tool. However, the database operates with reference to a limited suite of technical users, and the individual end-user may not be recognized.

It is further noted that user federation with cloud solutions may be based upon Security Assertion Markup Language (SAML) as an authentication method in order to avoid replicating users from on-premise identity providers (IdPs) to the cloud. But, most analytical clients only support basic username/password authentication and cannot perform SAML authentications (which require interaction with a web browser).

As the database application tools may be created by third parties (i.e., not the database developer), those analytical tools cannot readily be enhanced to support SAML. Therefore, another solution is needed to provide end-user SAML authentication for client analytical database tools lacking native SAML capability.

Moreover, a direct two-tier approach does not automatically allow for replication of end-users to databases that are located in the cloud. Therefore, database connections are established with technical users configured in the database.

These technical users are shared for all business users, but their credentials must be kept internal. Therefore, there needs to be a way for a remote end-user to log on and perform a switch to a technical user recognized for the database connection.

Finally, although database connections are established with technical users, both functional and instance based authorization checks are still performed on the actual end user. Therefore, the logged-on end user must be passed to the database in a secure and tamper-proof manner.

Accordingly, embodiments provide proxy-based access between an analytical client tool and a cloud database, without the need for a separate intervening application server. A client proxy (tool side) communicates exclusively with a server proxy (database side). In response to a connect request in a database protocol (e.g., Structured Query Language—SQL) received from the tool by the client proxy, the server proxy is caused to initiate an authentication process (e.g., using Security Assertion Markup Language—SAML) with an Identity Provider (IdP). The client proxy intercepts and extracts a security token from the IdP in order to establish a tunnel with the server proxy. Upon ultimately receiving the connect command through the tunnel, the server proxy replaces an end-user credential (recognized by the tool but meaningless to the database) with the security token in order to establish a technical user and a query session context that can be recognized by the database.

Figure 1:
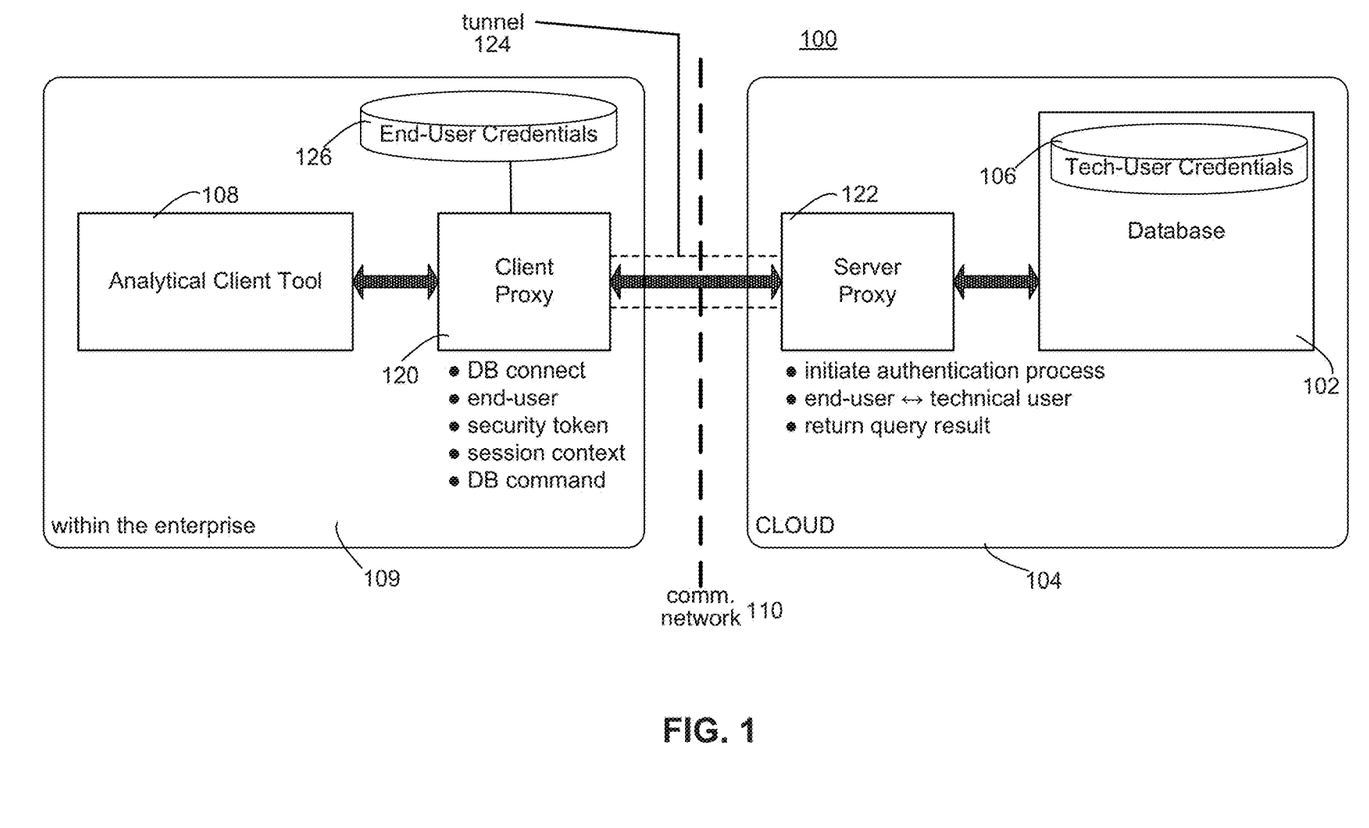
FIG. 1 shows a simplified diagram of a system according to an embodiment.

FIG. 1 shows a simplified view of a system configured to implement cloud database access according to an embodiment. Specifically, system 100 comprises a database 102 located in a cloud environment 104. The database accesses data according to technical user credentials 106.

An analytical client tool 108 is located remote from the cloud database in an enterprise environment 109. This analytical tool accesses the cloud database via a communications network 110. That communications network is assumed to be unsecured and may be accessible to the public (e.g., the internet).

In order to allow the analytical client tool to interact in a secure manner with the cloud database directly (i.e., without the need for an intervening application server), a client proxy 120 and a server proxy 122 are introduced. The client proxy and the server proxy communicate across the network via a tunnel 124.

Specifically, the client proxy first interacts with the server proxy to initiate an authentication process with an identity provider. For clarity of illustration, that identity provider is not depicted in FIG. 1, but is shown and described in other figures described later. In certain embodiments this authentication process may be conducted utilizing SAML.

Based upon a security token received by both the client proxy and the server proxy, the tunnel is established between them. That tunnel may be created utilizing WEBSOCKETS or similar technology That tunnel is then utilized to communicate a connect command from the analytical tool to the database utilizing a native database protocol. Examples of such native database protocols can include but are not limited to SQL (and variants thereof) and XMLA.

The connect command identifies the end-user according to end-user credentials 126 that are specific to a particular client. However such end-user credentials have no inherent meaning for the database, which is instead configured to recognize sets of technical users (e.g., marketing, personnel, finance, administrative) having different credentials and varying levels of data access rights and usage restrictions.

Accordingly, the server proxy functions to replace end-user credentials of the connect command received from the client proxy, with credentials that will allow the database to recognize a technical user. The security token (e.g. SAML) that was received from the identity provider is then added to the querying session context that was established in the database.

Having established a secure tunnel connection with the remote cloud database, the end-user located at the enterprise next accesses the analytical tool in order to pose queries to the database. Those queries are in the form of commands in the database protocol (e.g., SQL).

The server proxy in turn receives these commands from the client proxy, and issues them to the database using the previously established connection identifying the session context data including the corresponding security token. This information allows the database to recognize the end user and associated end user permissions.

The database processes the query commands according to the corresponding technical user credentials and session information, generating relevant query results. Those query results are then ultimately returned to the analytical tool along a pathway that includes the server proxy, the tunnel, and the client proxy.

One particular example is described later below in connection with FIGS. 3-4. Also, further details regarding the various elements of FIG. 1 are now provided.

The client proxy is an application started by the end-user before the analytical client tool is used. The client proxy establishes a connection with the server proxy over HTTPS, providing a network tunnel for further communication with the cloud. The tunnel may be provided, for example, using WEBSOCKETS or similar technologies.

Upon starting, the client proxy opens a web browser window that initially connects to the server proxy. The server proxy issues an explicit authentication request to the identity provider (described further in the example of FIGS. 3-4 below), thereby implementing the SAML authentication request protocol.

Upon successfully logging in, the end-user is known in the server proxy. A communication tunnel is thus established.

Next, the client proxy opens a local port allowing analytical client tool(s) to connect with username/password credentials and their native protocol. Those credentials are configured and validated within the client proxy, thereby securing end-to-end authentication from the analytical client tool to the server proxy.

To accomplish this goal, the client proxy intercepts the SQL CONNECT request issued by the analytical client tool in the database network protocol. The client proxy extracts the username/password provided and validates that end-user credential against the configured values.

This process desirably permits transparent authentication without requiring code changes in the external analytical tool (which may be controlled by other than the database developer). Therefore, the client proxy serves not just as generic tunneling proxy, but also as a database-specific component providing unique value.

Once the client proxy has established a network tunnel, the native database protocol used by an analytical client tool can be forwarded to the server proxy. This circumvents network restrictions such as HTTP traffic only.

From the perspective of the end-user (and the analytical client tool), the client proxy functions as a representative of the actual database. Moreover, the client proxy also offers a transparent and secure switch between different end-user authentication approaches (e.g., from basic username/password to SAML).

Details regarding certain server proxy embodiments are now described. The server proxy is the counterpart of the client proxy. The server proxy acts as the other end of the network tunnel, and provides the server side implementation of the SAML authentication request protocol.

Moreover, the database is configured to recognize and interact only with technical users (rather than actual individual end-users of the tool themselves). In order to avoid the inefficiency of replicating every end-user into a corresponding unique technical user, the server proxy also serves as an interface to allow the database to use the security token to recognize tool end-users in addition to technical users of the database.

First, the server proxy is configured with the technical user to be employed for the actual connection to the database. Different server proxy instances can be configured with different technical users that also have different database permissions. This can desirably serve to further restrict access to pools of end-users who are assigned to different server proxies.

The server proxy intercepts a SQL CONNECT request from an analytical client tool in the database protocol that is tunneled between the two proxies. The username/password provided by the end-user is used only to authenticate at the client proxy—that credential has no inherent meaning on the database. So, the server proxy replaces those end-user credentials with the technical user credentials configured in the database.

Under certain circumstances, more than one end-user may use a shared technical user for the database connection. As an example, a plurality of individual end users belonging to a product team may use a shared product technical user, while a plurality of individual end users of a human resources department may use a shared personnel technical user.

In order to make the authenticated individual end-user known to the database, that individual end-user identified during the SAML authentication at the server proxy is now set into the database session context. This context allows the database to perform authorization checks based upon the user and group information in the SAML token.

For example, the HANA in-memory database available from SAP SE of Walldorf, Germany allows direct passage of a SAML token for identifying individual end users. This last (context) step affords end-to-end authentication from the client proxy to the database.

Alternatively, just the username could be set in the database session context. This username could still be trusted as long as only the server proxy is able to set this data. (If the client tried to directly set this data, it would need to be filtered at the server proxy).

From the database perspective, communication with the server proxy mimics a connection with an application server to which an end-user is logged in. However there is no actual application server involved, and the analytical client tool is the direct consumer of the database. Nevertheless, embodiments allow leveraging of existing protocols, authorization models, and implementations without requiring any change to the analytical client tool itself Embodiments may offer one or more benefits in allowing communication with a database located on the cloud. For example, the approach described offers transparency to both the analytical client tool and the database, not requiring modification of either component.

From the perspective of the analytical client tool, the client proxy appears as the database. From the perspective of the database, the analytical client tool appears as an (absent) application server.

By contrast, if the database were instead confronted with the analytical client tool directly (e.g. if the communication was simply tunneled in a generic manner), the database would expect to receive credentials of a technical user and look for the end-user in a session context. Neither aspect would be provided by the analytical client tool working alone.

Accordingly, embodiments allow the necessary authentications and user mappings to be performed, without requiring the other components (tool, database) to be specifically adapted.

Figure 2:
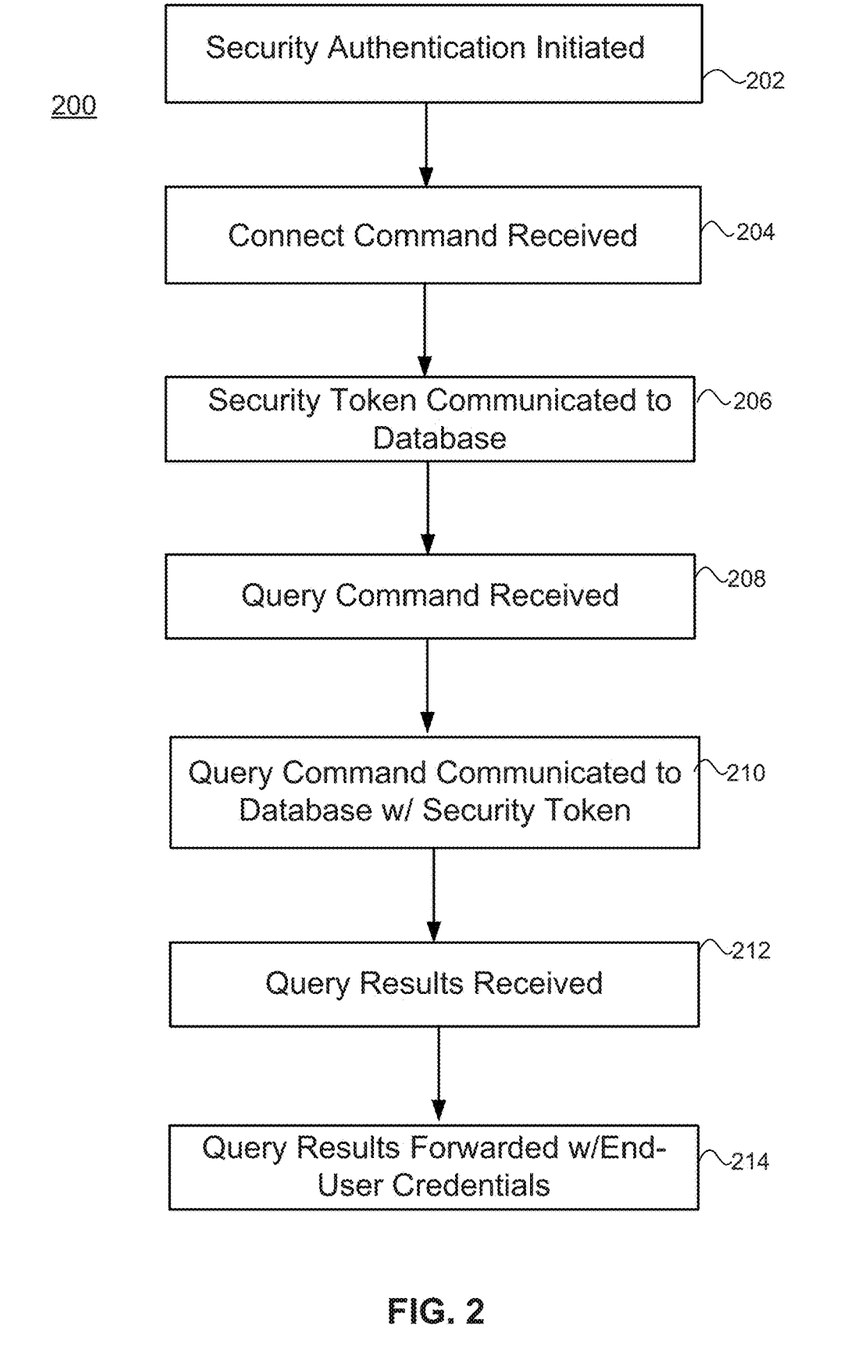
FIG. 2 shows a simplified flow diagram of a method according to an embodiment.

FIG. 2 is a simplified flow diagram showing a method 200 according to an embodiment. At 202, a server proxy initiates an authentication process with an identity provider to generate a security token.

At 204 the server proxy receives through a tunnel created by a client proxy using the security token, a connect command including end-user credentials. At 206, in response to the connect command, the server proxy communicates the security token to the database for recognition of the end-user and adding it to a session context.

At 208 the server proxy receives a query command through the tunnel. At 210 the server proxy communicates the query command to the database using the security token from the session context to filter the result set to those rows the end-user has access to.

At 212 the server proxy receives query results from the database. At 214, the server proxy forwards the query results including the end-user credentials to the proxy server via the tunnel.

Example

Figure 3:
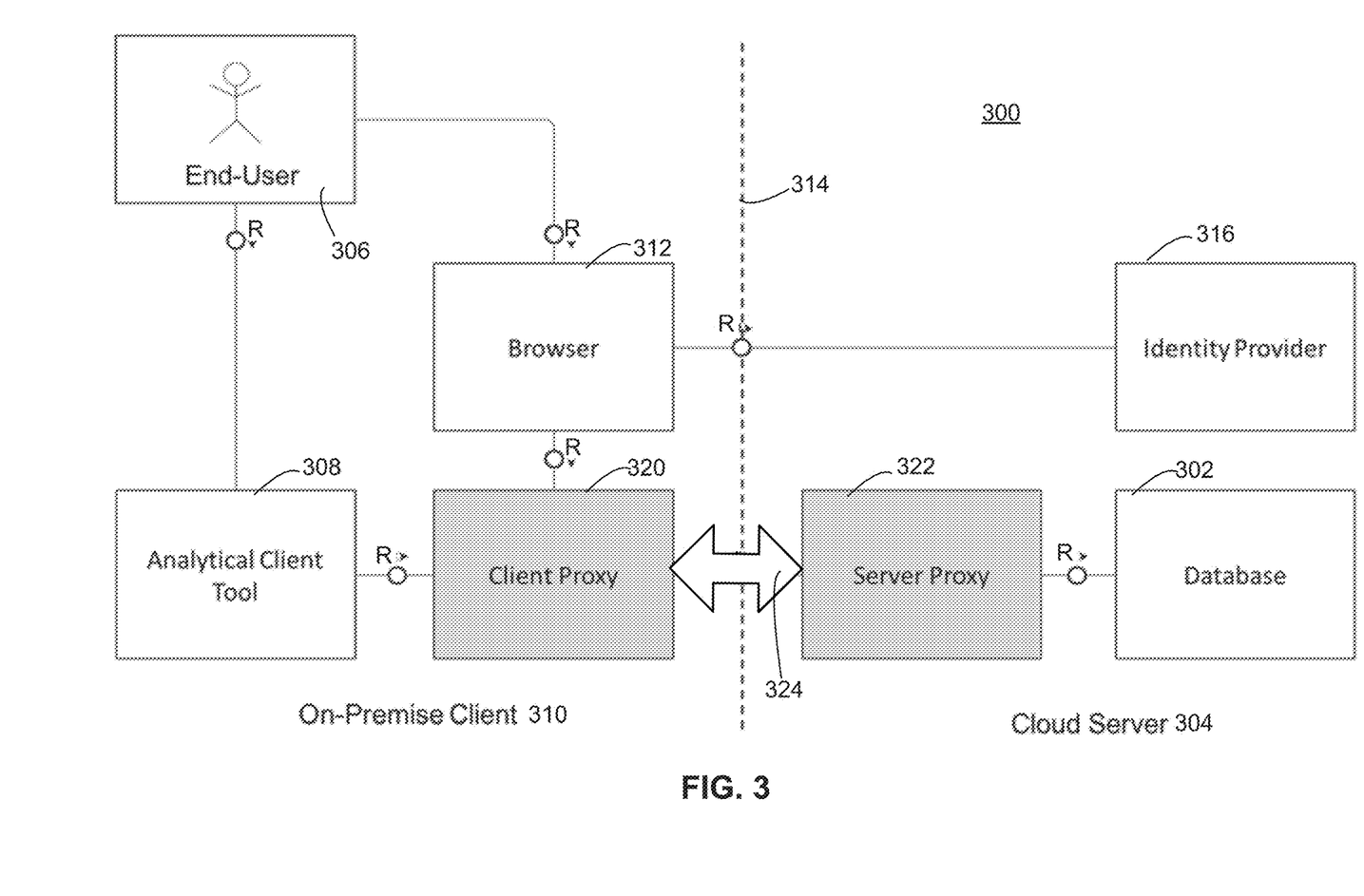
FIG. 3 shows components of an embodiment of a system according to an example.
Figure 4:
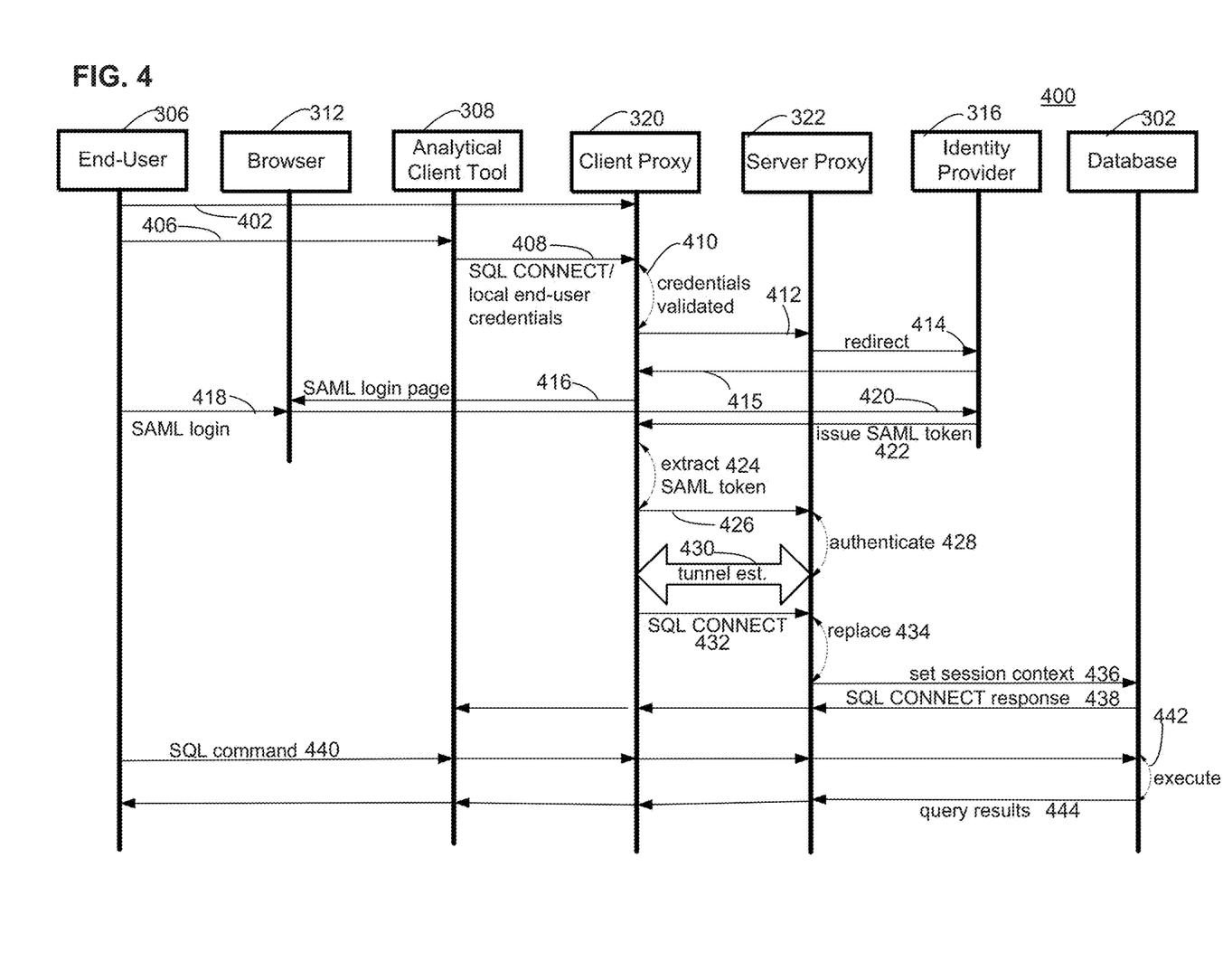
FIG. 4 shows a flow diagram of signals according to the example.

A particular example is now presented in connection with FIGS. 3-4. This example describes proxy-based cloud database access specifically utilizing the SQL database protocol and the SAML authentication process.

FIG. 3 shows a simplified view of a system affording cloud database access according to an embodiment. Specifically, system 300 comprises a database 302 located within a cloud server 304. An end-user 306 is in communication with an analytical client tool 308 at an on-premises client 310. The tool end user is also in communication with a browser 312.

The end user can utilize the browser to communicate across communication network with an identity provider 316.

The system 300 further comprises client proxy 320 (at the on-premises client) in communication with server proxy 322 (at the cloud server) across the communications network. A tunnel 324 established between the client proxy and the server proxy affords secure data communication between the analytical client tool and the database, notwithstanding the absence of a conventional intervening application server.

Specifically, FIG. 4 provides an overview of the communication flow 400 between the various components of the system of FIG. 3.

At 402 the user launches the client proxy. At 406 the user launches the client tool.

At 408 the client tool issues a SQL CONNECT to the client proxy, passing the local end-user credentials as configured in the client tool.

At 410 the client proxy validates the received credentials against those stored in the client proxy.

At 412 the client proxy connects to the server proxy. At 414 the server proxy redirects the client proxy to the Identity Provider. A result of this redirect is a SAML logon page returned 415 to the client proxy.

At 416 the client proxy launches the browser in order to show the SAML logon page. At 418 the end-user provides SAML credentials and logs on 420 at the Identity Provider using the browser.

As a result a SAML token is issued 422. The browser is redirected to the server proxy. The client proxy intercepts this redirect, extracts 424 the SAML token and forwards 426 the SAML token to the server proxy for authentication 428.

Now that the user is authenticated at the server proxy, the tunnel between client proxy and server proxy is established 430.

Now that the tunnel is established, the SQL CONNECT originally from the client tool can finally be forwarded 432 from the client proxy to the server proxy.

The server proxy receives this SQL CONNECT and replaces 434 username/password passed from the client tool (and meaningless to the database), with the technical username/password configured in the server proxy that matches the data in the database.

The server proxy uses the credentials it received in the SAML token to set 436 the user information in the database session context. Now the call stack is unwound and the response to the SQL CONNECT is returned 438 all the way to the client tool.

Now the client tool can issue regular queries that are passed thru both proxies to the database and back with the results. At 440 the analytical client tool sends SQL commands to the client proxy. The client proxy forwards these commands through the established network tunnel to the server proxy, which in turn forwards them to the database.

The database executes 442 the requested queries. This query execution may take into account the database permissions of the technical user used to establish the database connection, as well as the end-user information set in the database session context.

At 444 the database passes back the query results via server proxy, tunnel, and client proxy to the analytical client tool, and ultimately, to the end-user.

The examples just provided are given for purposes of illustration only, and embodiments are not limited to them. Thus while FIG. 3 shows the server proxy as being separate from the database, this is not required.

In certain embodiments the server proxy may be implemented by a database engine, for example as present in an in-memory database. One example of such an in-memory database engine is that of the HANA in-memory database available from SAP SE of Walldorf, Germany.

Figure 5:
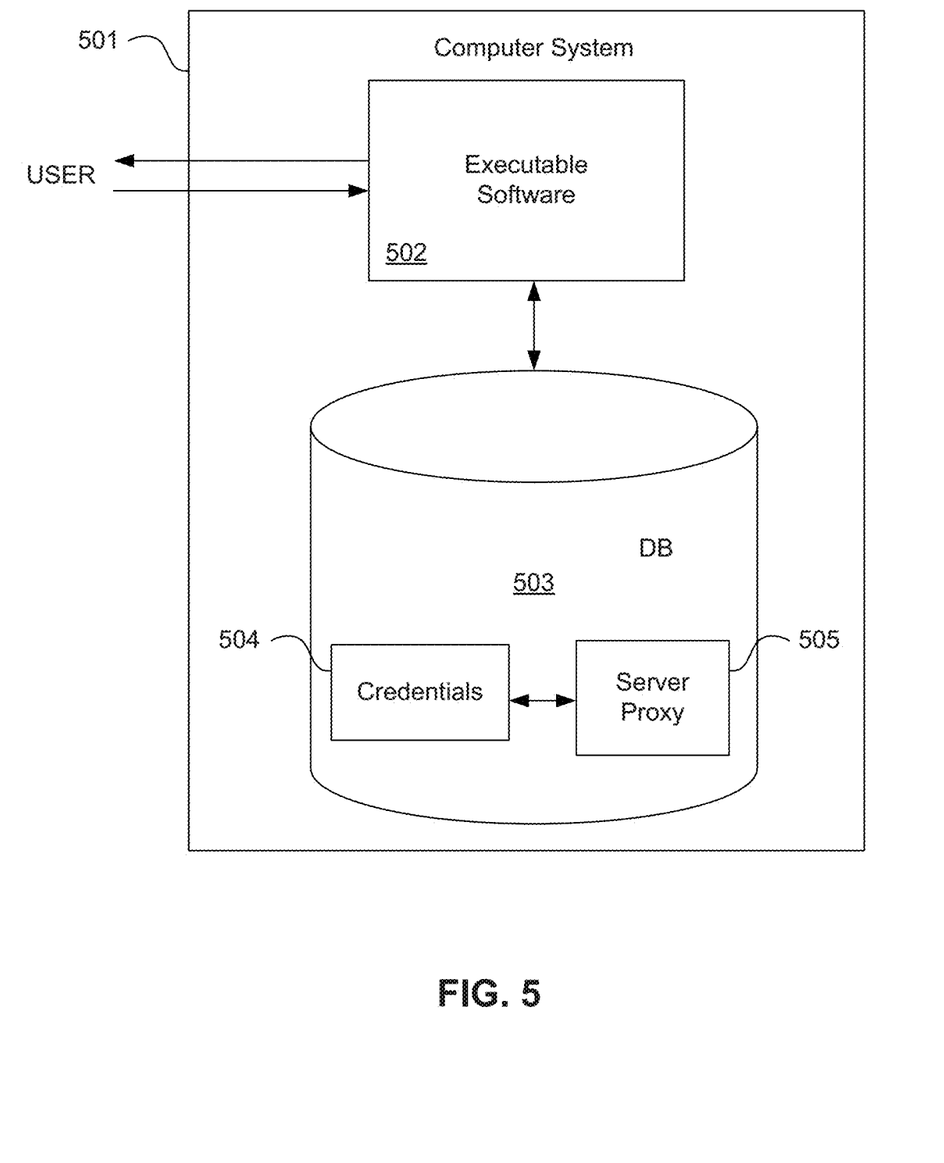
FIG. 5 illustrates hardware of a special purpose computing machine configured to implement cloud database access according to an embodiment.

For example, FIG. 5 illustrates hardware of a special purpose computing machine configured to implement database access according to an embodiment. In particular, computer system 501 comprises a processor 502 that is in electronic communication with a non-transitory computer-readable storage medium comprising a database 503. This computer-readable storage medium has stored thereon code 505 corresponding to a server proxy. Code 504 corresponds to credentials (e.g., technical credentials and/or end-user credentials). Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

While the embodiments described above relate to implementing direct SQL communication without an intervening application server, a similar approach can also be applied to other protocols like the HTTP-based Extensible Markup Language for Analysis (XMLA) protocol that is relied upon by other database tools. Again, the client and server proxies are implemented to provide an appropriate protocol handler allowing the switch of user credentials (e.g., between end-user username/password expected by the analytical client tool, and technical user credentials expected by the database).

Figure 6:
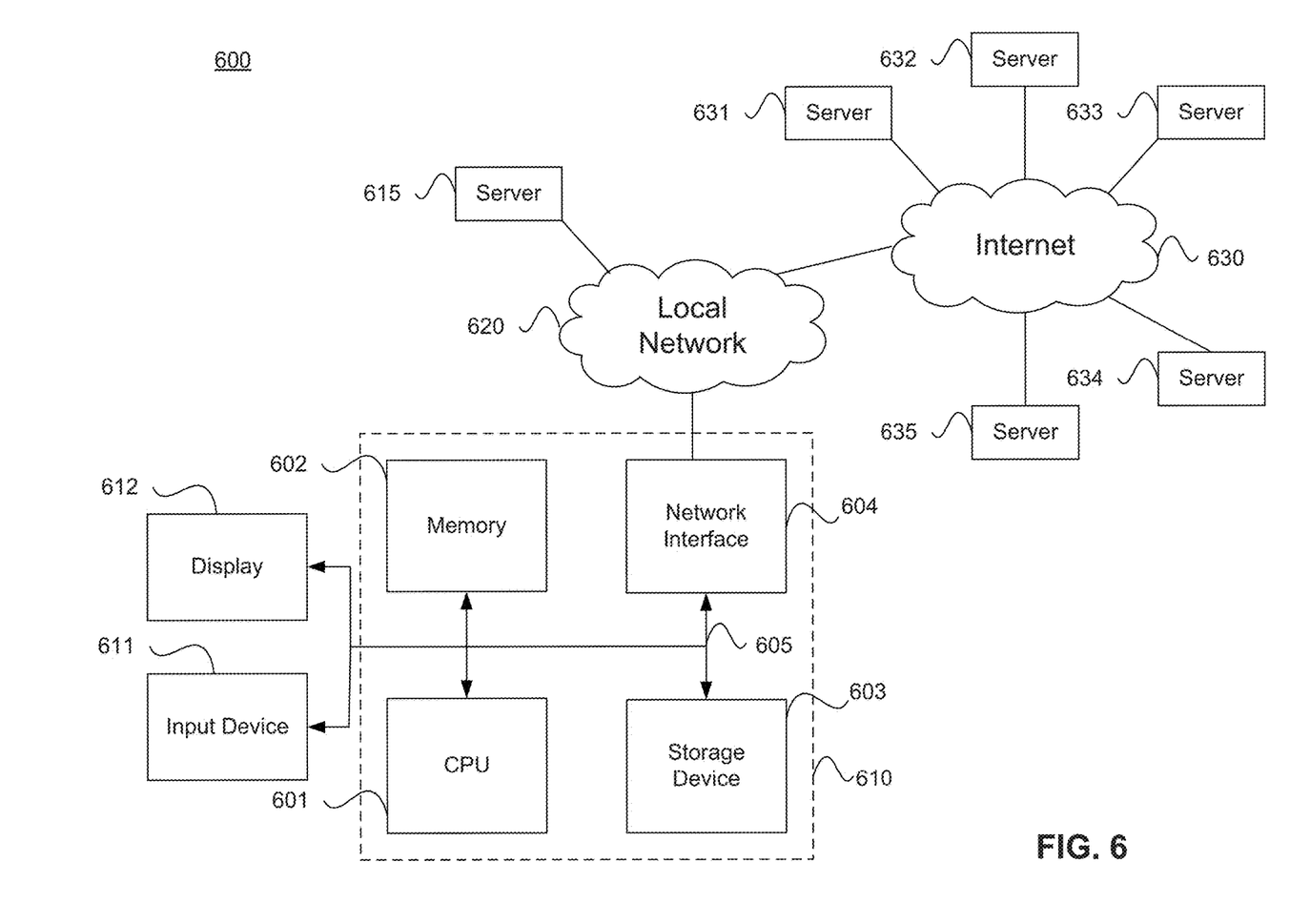
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
in response to a connect command in a database protocol received from a client proxy, a server proxy implemented as an in-memory database engine of an in-memory database, initiating an authentication request to an identity provider;
the server proxy establishing a tunnel with the client proxy by authenticating an end-user from a security token issued by the identity provider and extracted by the client proxy;
the server proxy receiving the connect command and a credential through the tunnel;
storing the credential in the in-memory database;
the server proxy replacing the credential in the in-memory database with a technical user credential;
the server proxy communicating the connect command to the in-memory database using the technical user credentials;
the server proxy adding the security token to a session context established in the in-memory database;
the server proxy receiving through the tunnel a query command including the credential;
the server proxy forwarding the query command to the in-memory database within the session context;
the server proxy receiving from the in-memory database a query result corresponding to the query command; and
the server proxy forwarding the query result through the tunnel to the client proxy.

2. A method as in claim 1 wherein the database protocol comprises structured query language (SQL).

3. A method as in claim 1 wherein the database protocol comprises extensible markup language for analysis (XMLA).

4. A method as in claim 1 wherein the security token comprises a Security Assertion Markup Language (SAML) token.

5. A method as in claim 1 wherein the session context is determined from the security token.

6. A method as in claim 1 wherein the session context is determined from the credential.

7. A method as in claim 6 wherein the credential comprises a username.

8. A non-transitory computer readable storage medium embodying a computer program for performing a method, said method comprising:
- in response to a connect command in a database protocol received from a client proxy, a server proxy implemented as an in-memory database engine of an in-memory database, initiating an authentication request to an identity provider;
- the server proxy establishing a tunnel with the client proxy by authenticating an end-user from a Security Assertion Markup Language (SAML) token issued by the identity provider and extracted by the client proxy;
- the server proxy receiving the connect command and a credential through the tunnel;
- storing the credential in the in-memory database;
- the server proxy replacing the credential in the in-memory database with a technical user credential;
- the server proxy communicating the connect command to the in-memory database using the technical user credentials;
- the server proxy adding the SAML token to a session context established in the in-memory database;
- the server proxy receiving through the tunnel a query command including the credential;
- the server proxy forwarding the query command to the in-memory database within the session context;
- the server proxy receiving from the in-memory database a query result corresponding to the query command; and
- the server proxy forwarding the query result through the tunnel to the client proxy.

9. A non-transitory computer readable storage medium as in claim 8 wherein the database protocol comprises structured query language (SQL).

10. A non-transitory computer readable storage medium as in claim 8 wherein the database protocol comprises extensible markup language for analysis (XMLA).

11. A non-transitory computer readable storage medium as in claim 8 wherein the session context is determined from the SAML token.

12. A non-transitory computer readable storage medium as in claim 8 wherein the session context is determined from the credential.

13. A non-transitory computer readable storage medium as in claim 12 wherein the credential comprises a username.

14. A computer system comprising:
- one or more processors;
- a software program, executable on said computer system, the software program configured to cause an in-memory database engine of an in-memory database, to function as a server proxy that:
- in response to a connect command in a database protocol received from a client proxy, initiates an authentication request to an identity provider;
- establishes a tunnel with the client proxy by authenticating an end-user from a security token issued by the identity provider and extracted by the client proxy;
- receives the connect command and a credential through the tunnel;
- stores the credential in the in-memory database;
- replaces the credential in the in-memory database with a technical user credential;
- communicates the connect command to the in-memory database using the technical user credentials;
- adds the security token to a session context established in the in-memory database;
- receives through the tunnel a query command including the credential;
- forwards the query command to the in-memory database within the session context;
- receives from the in-memory database a query result corresponding to the query command; and
- forwards the query result through the tunnel to the client proxy.

15. A computer system as in claim 14 wherein the database protocol comprises structured query language (SQL).

16. A computer system as in claim 14 wherein the database protocol comprises extensible markup language for analysis (XMLA).

17. A computer system as in claim 14 wherein the security token comprises a Security Assertion Markup Language (SAML) token.

18. A computer system as in claim 17 wherein the session context is determined from the SAML token.

19. A computer system as in claim 14 wherein the session context is determined from the credential.

* * * * *